United States Patent [19]

Astle et al.

[11] 3,798,059

[45] Mar. 19, 1974

[54] THICK FILM INDUCTOR WITH FERROMAGNETIC CORE

[75] Inventors: Brian Astle, Indianapolis, Ind.; Jean Marie Guiot, Ann Arbor, Mich.

[73] Assignee: RCA Corporation, New York, N.Y.

[22] Filed: Apr. 20, 1970

[21] Appl. No.: 29,957

[52] U.S. Cl. .................. 117/212, 117/215, 117/217, 117/235, 117/239, 336/200

[51] Int. Cl. .................. B44d 1/18

[58] Field of Search ............ 336/200; 117/212, 215, 117/240, 217, 227, 235, 239; 252/519

[56] References Cited

UNITED STATES PATENTS

| | | | |
|---|---|---|---|
| 3,413,716 | 12/1968 | Schwartz et al. | 117/212 X |
| 3,210,707 | 10/1965 | Constantakes | 336/200 |
| 3,247,573 | 4/1966 | Noack | 336/200 X |
| 3,484,654 | 12/1969 | Honeuer | 117/212 X |
| 2,795,680 | 6/1957 | Peck | 252/519 X |
| 3,560,388 | 2/1971 | Higashi | 117/235 X |
| 2,956,909 | 10/1960 | Robinson | 117/212 X |
| 3,374,110 | 3/1968 | Miller | 117/212 |
| 3,434,877 | 3/1969 | Degenkolb et al. | 117/212 |
| 3,347,703 | 10/1967 | Engleman et al. | 117/212 |

*Primary Examiner*—Alfred L. Leavitt
*Assistant Examiner*—Caleb Weston
*Attorney, Agent, or Firm*—Glenn H. Bruestle; William S. Hill

[57] ABSTRACT

Thick film inductor suitable for hybrid integrated circuits comprising successive layers of powdered sintered ferromagnetic material in a cured catalyst-hardenable resin binder and a pattern of conductors comprising powdered metal in a cured catalyst-hardenable resin.

13 Claims, 18 Drawing Figures

INVENTORS
BRIAN ASTLE &
BY JEAN MARIE GUIOT
W. S. Hill
Agent

INVENTORS
BRIAN ASTLE &
BY JEAN MARIE GUIOT
W. S. Hill
Agent

THICK FILM INDUCTOR WITH FERROMAGNETIC CORE

BACKGROUND OF THE INVENTION

One type of microminiaturized circuit in common use is the monolithic semiconductor type. In this type of circuit, all active and passive circuit components are fabricated on or in a single chip of single crystal semiconducting material. The monolithic type circuit has advantages such as extremely small size, very short connecting leads, good reproducibility and low manufacturing costs when hundreds of similar circuits are fabricated simultaneously on a single wafer of a semiconducting material.

However, the monolithic circuit also has certain limitations and disadvantages. Because of its extremely small size, its power handling capabilities are low. Also, the amount of capacitance that can be included in any one circuit unit is small because of limited space available. And, up to the present, it has been almost impossible to build inductors into these circuits. Consequently, circuit designers have been forced to design circuits which do not require inductors.

Because of these limitations and a desire for greater flexibility of design, product manufacturers have been turning to an increasing extent to so-called hybrid circuits. These circuits usually include conventional semiconductor chips containing transistors and diodes. But the chips are mounted on an insulating substrate also containing passive components such as resistors, capacitors and inductors in any one of several different forms.

For example, the passive components may be conventional, discrete, miniature-sized units mounted separately on the substrate and connected together with printed wiring or soldered wires. Or, more desirably, because of lower cost of manufacture, the passive circuit components may be deposited as films.

One type of film-deposited unit is made by evaporating the required layers of conductors, insulators and resistance materials. This is known as a thin-film type unit. A more desirable type of unit from a manufacturing cost standpoint is a thick-film type. In this type of component, the layers of the various materials are usually deposited on a ceramic substrate by screen printing although other methods can also be used.

Although inductors can readily be made and included in thick-film circuits, in the past these have usually comprised simple spirals of metal ink deposited directly on a ceramic or other insulating substrate. In this type of inductor, the magnetic field is produced solely by the current through the inductor film, since the substrate material is non-magnetic. Furthermore, if the spiral is made large enough to be of more practical value, the length of the spiral path introduces large values of series resistance, leading to lower Q.

There have been various attempts to improve this situation. One of these is to deposit layers of magnetic material (such as metals) by evaporation beneath or on top of (or on both sides of) a metal spiral. This type of unit is relatively costly to make, is not compatible with other screen-printed components and is not usable at higher frequencies.

Another type of inductor previously proposed is one in which the substrate itself is a magnetic material such as a ferrite plate. The ferrite body becomes the magnetic core of the device, which may include a helix of film conductors running around both faces and edges of the plate or around part of it. In this type of inductor, the Q and other electrical properties are satisfactory, but there are also disadvantages. If the entire circuit substrate is made of the ferrite, the cost is much higher than if the substrate is a ceramic such as alumina. Moreover there may be problems in preparing the ferrite body surface to receive screen-printed resistors and capacitors. If the ferrite body is used only as the substrate for the inductor, the inductor then becomes a separate unit again and must be mounted on the substrate of the circuit.

Still another type of inductor has previously been proposed which is made by depositing a layer of an unfired ferrite-forming mixture on a refractory substrate, a spiral of gold wire on the ferrite mix layer and another layer of ferrite mix over the gold spiral. This composite is then sintered to form the magnetic ferrite material. A gold conductor is used to withstand the sintering temperature. By this method, inductors can be made with high Q factors and large inductances per unit area. But, because of the high processing temperatures involved, the inductor must be made apart from the rest of the circuit and must either be fired before other screen-printed components are deposited or made as a separate mountable unit.

OBJECTS OF THE INVENTION

One object of the present invention is to provide an improved method of making relatively high Q inductors for thick-film hybrid circuits.

Another object of the invention is to provide an improved inductance unit for thick-film hybrid circuits which is low in cost but which has relatively high Q at high frequencies.

Another object of the invention is to provide improved inductor designs for hybrid circuits.

The objects of the present invention are achieved by constructing an improved inductor from successive layers of deposited sintered powdered ferromagnetic material in a catalyst-hardenable resin and a pattern of electrical conductors composed of metal particles in a catalyst-hardenable resin.

THE DRAWING

Figures 5, 6:
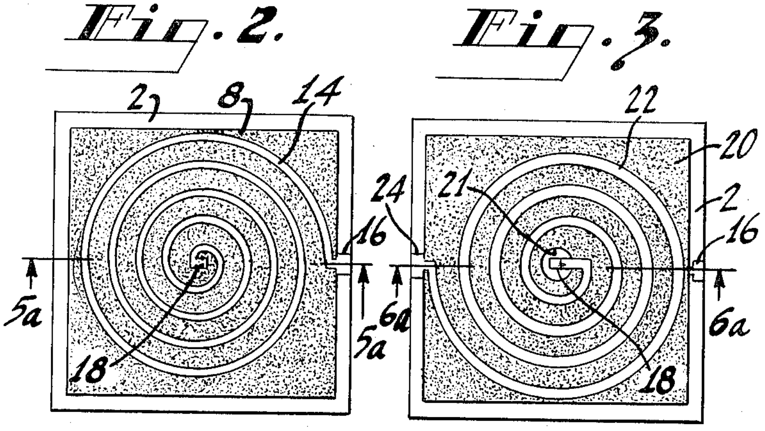
FIG. 5 is a top plan view illustrating an early stage of making a double-spiral inductor in accordance with another embodiment of the present invention.
Figure 5A:
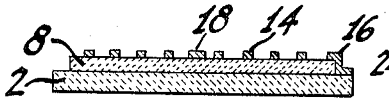
Figure 6A:
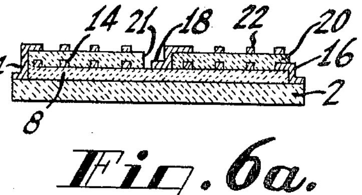
Figure 7:
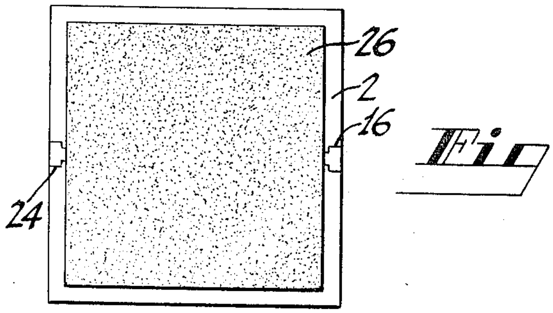
Figures 11, 13, 15:
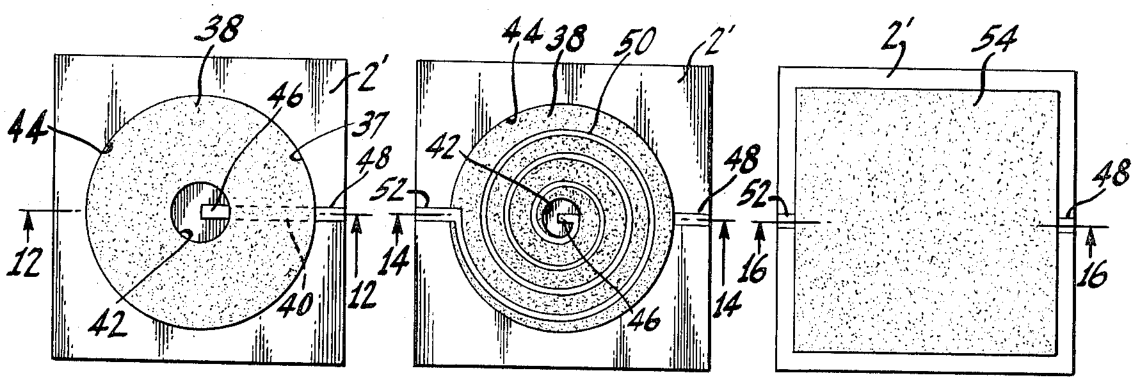
Figures 12, 14, 16:
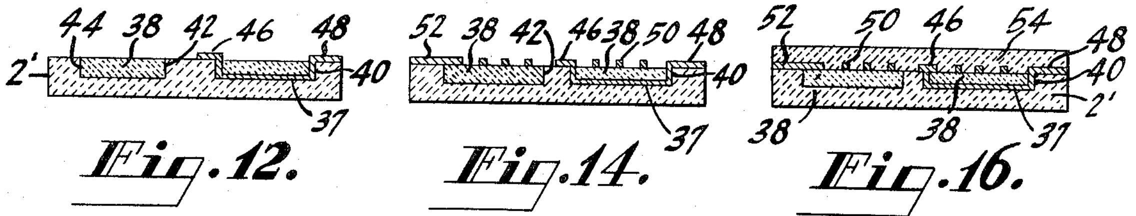
Figure 8:
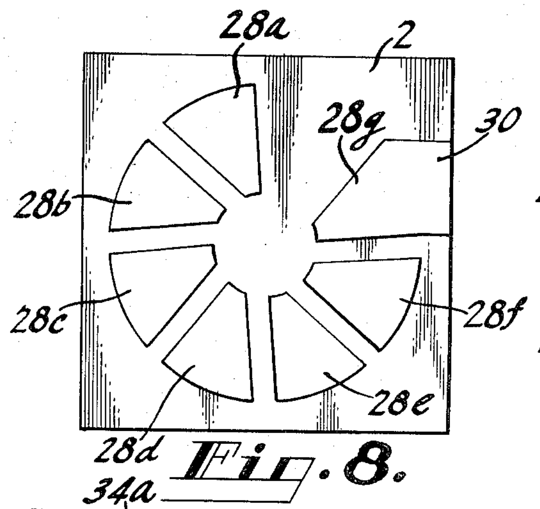
Figure 9:
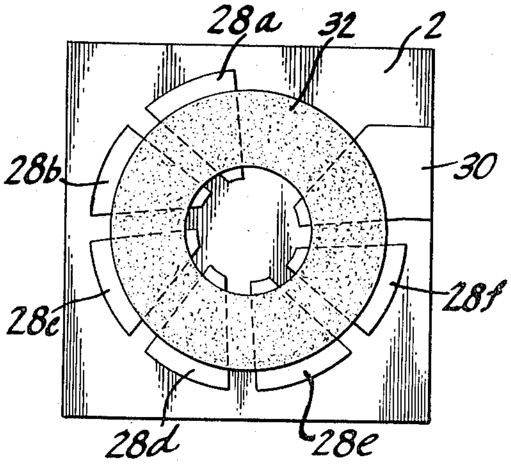
Figure 10:
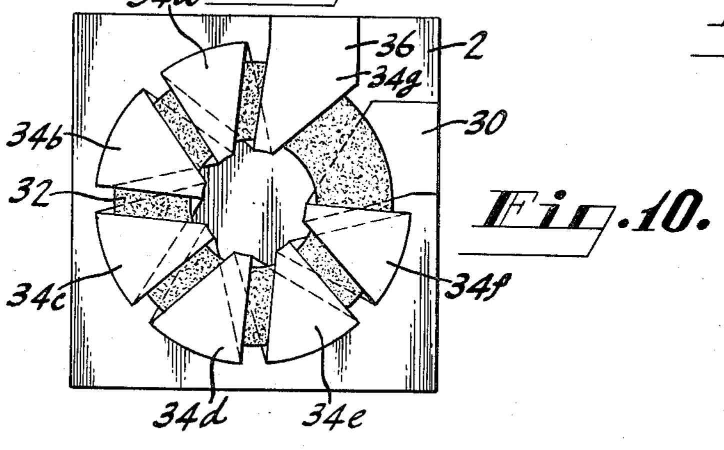

FIG. **5*a*** is a section view taken along the line *5a*—*5a* of FIG. 5;

FIGS. 6 and 7 are views similar to that of FIG. 5 illustrating later stages of manufacture of the double-spiral inductor;

FIG. **6*a*** is a section view taken along the line *6a*—*6a* of FIG. 6;

FIG. 8 is a top plan view illustrating an early stage of manufacture of a novel plate-type toroid inductor of the present invention;

FIGS. 9 and 10 are views similar to that of FIG. 8 illustrating later stages of manufacture of the plate-type toroid;

FIG. 11 is a top plan view of an early stage in the manufacture of another modification of an inductor of the present invention;

FIG. 12 is a cross section view taken along the line 12—12 of FIG. 11;

FIG. 13 is a top plan view similar to that of FIG. 11, illustrating a later stage in the manufacture of the inductor of FIG. 11;

FIG. 14 is a cross section view taken along the line 14—14 of FIG. 13;

FIG. 15 is a top plan view illustrating still a later stage in the manufacture of the inductor of FIG. 11, and FIG. 16 is a cross-section view taken along the line 16—16 of FIG. 15.

DESCRIPTION OF PREFERRED EMBODIMENT

Figure 1:
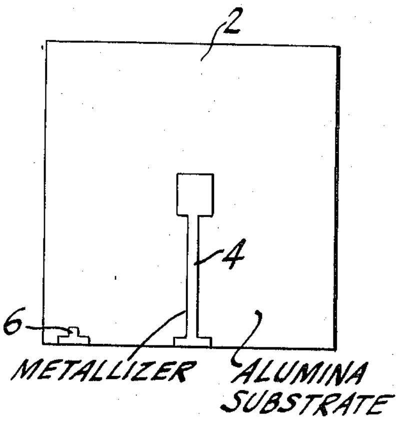
FIG. 1 is a top plan view of a substrate and connections, illustrating a first stage in manufacture of an inductor of the present invention.

A single-spiral inductor of the present invention may be made as follows. On an alumina wafer 2 (FIG. 1), a center connection 4 and an edge connection 6 are deposited. These connections are made from a composition consisting of 4 parts by weight of silver powder and 1 part by weight of a binder composed of 54 percent by weight epoxy resin (Araldite 6010 of the Ciba Co.) and 46 percent by weight epoxy resin hardener (Araldite hardener 916). The composition of metal powder and resin mixture (to which an accelerator such as Araldite 062 is added immediately prior to use) is screen printed on the substrate and cured at 150°C. for about 30 minutes to 1 hour.

Figure 2:
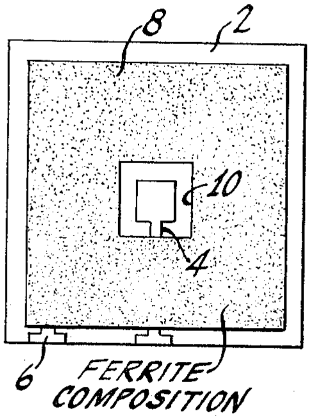
FIGS. 2, 3 and 4 are similar views illustrating later stages in manufacture of the inductor.

As shown in FIG. 2, a first composite layer of magnetic ferrite 8 is deposited on the substrate 2 and over the connections 4 and 6. In the present example, the composite layer 8 consists of two separate layers each made by an identical process. The separate layers are deposited by screen printing a composition containing a sintered powdered ferrite made by firing the composition NiO — 10%, ZnO — 6%, MnO — 1% and $Fe_2O_3$ — 83%. All percentages are by wieght. This is a commercial ferrite having the trade name "Ceramag 11" and is sold by Stackpole Carbon Co., Electronic Components Div., St. Marys, Pa. The ferrite has an initial permeability of 115 and a volume resistivity of $2.5 \times 10^7$ ohm cm. at 30°C. The sintered powdered ferrite is mixed with the same epoxy resin mix described above in the proportion of 4 parts by weight ferrite to 1 part by weight resin-hardener mixture. Each of the two screened-on separate layers has a thickness of about 3 mils and each layer is cured at 150°C. for at least about 30 minutes after depositing.

The composite ferrite layer 8 has a central aperture 10 to allow access to the central connector 4 and the layer is dimensioned so that it does not cover the edge connector 6.

Figure 3:
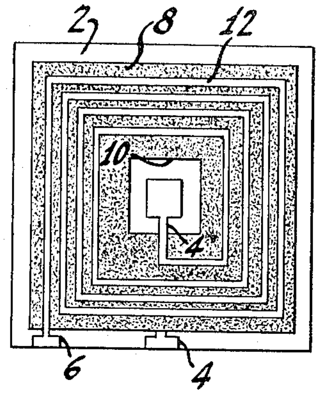
Figure 4:
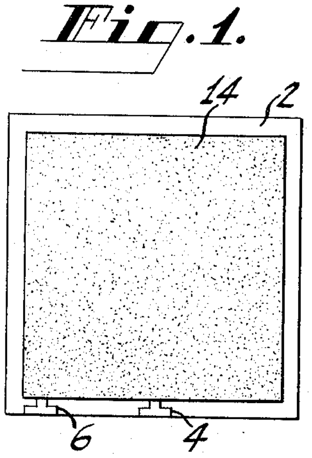

A conducting spiral 12 (FIG. 3) is then deposited on the cured ferrite layer 8. For testing purposes, a 4-turn spiral with outside dimensions 10 mm. on a side, may be used. Pitch of the spiral is 0.5 mm. The spiral is made by screen printing a conducting ink having the same composition described above. After deposition, the spiral is cured at 150°C. for 30 minutes.

Next step is to deposit a second ferrite layer 14 on top of the metal spiral layer 12. The ferrite layer 14 is also a composite layer made up of two separate layers, each made as described above for the composite layer 8. This layer fills in the central aperture 10 in the layer 8 and its outside dimensions are the same as those of the layer 8. Thus, ends of connectors 4 and 6 are not covered. The completed device is then additionally cured at 150°C. for about 2 hours.

Compared to a similar coil printed on a ceramic substrate with no ferrite layers, the inductor of the above example had a higher Q at frequencies up to about 50 megahertz; and at all frequencies tested up to and including 100 MHz, the inductor of the present invention had a higher inductance. For example, the coil without ferrite had an inductance of 0.24 $\mu$H, whereas the coil with ferrite had an inductance of 0.34 $\mu$H.

Inductors were also made with composite top and bottom ferrite layers each composed of three separate layers each 3 mils thick. This device had somewhat lower Q at all frequencies but higher values of inductance averaging about 0.36 $\mu$H.

When four ferrite layers were used in each composite layer, average value of inductance was about 0.41 $\mu$H.

A number of modifications can be made in the inductors within the scope of the invention. Some of these modifications are in the materials used.

The magnetic material should have a low tan $\delta$ at the frequencies of operation. It should also have a magnetic permeability of at least about 20, as measured before powdering. Although ferrites are preferred, other magnetic materials such as carbonyl iron can also be used.

The ratio of magnetic powder to binder should be as high as possible consistent with the method of application. For example, the screen-printing process imposes a limit on the viscosity. Other methods such as brushing or doctor blading can also be used. By using a temporary solvent, such as butyl carbitol acetate, it has been possible to use a percentage by weight of ferrite as high as 85.

Advantages of the epoxy resin system, as described, are: (1) No firing is required, (2) after curing it will withstand temperatures up to 200°C., and (3) the magnetic material, when added to the windings, increases the inductance (and the Q at lower frequencies). Other catalyst-hardenable resins may also be used.

Other screen-printable metallizing systems may be used to deposit the conductors. In general, a powdered metal with good conducting properties, in a catalyst-hardenable resin should be used. Silver or silver alloys are preferred because the metal oxide is also a good conductor and no precautions need be taken to inhibit oxidation.

Many modifications can also be made in the geometrical aspects of the inductors of the invention.

One of these modifications is that the top composite ferrite layer may be omitted entirely, although this usually results in lower inductance than if top and bottom layers are both used.

Another modification is illustrated in FIGS. 5, 6 and 7. This is a double-spiral device including a first layer of ferrite 8 disposed on a ceramic substrate wafer 2 and a first conductor spiral 14 screen printed on the first ferrite layer. A printed connector 16 extends from the outer edge of the spiral to an edge of the ceramic plate. Another connection pad 18 is also provided in the center of the spiral.

A second layer of ferrite 20 is then put down over the first spiral 14, with a central aperture 21 exposing the connecting pad 18.

A second conductor spiral 22 is then deposited on the second ferrite layer 20, the spiral being wound in a direction such that when its center turn is connected to the connector pad 18 of the first spiral, current through both spirals will travel in the same direction. Another printed connector 24 is also provided between the outer turn of the spiral 22 and an outer edge of the ceramic plate 2.

Finally, a third ferrite layer 26 is deposited over the conductor spiral 22.

Still another embodiment of the invention is illustrated in FIGS. 8, 9 and 10. As shown in FIG. 8, a roughly annular configuration of individual metal blade-like elements 28*a* to 28*g* is deposited by a method such as screen printing on a ceramic substrate 2. Each of these elements is to become one-half turn of a toroid winding, hence each element is given a shape such that its inner edge is an arc of a small circle near the center of the plate 2 and its outer edge is a longer arc of a larger circle more remote from the center of plate 2. Each of the lateral edges of each blade are portions of chords of the larger circle and set at angles such that when the article is completed with a separating layer and a top series of elements, the result will be a toroid with the winding being plate-like or ribbon-like instead of filamentary.

One of the elements, 28*g*, is provided with a bonding pad 30 extending outward to the edge of ceramic substrate 2.

As shown in FIG. 9, an annular layer of ferrite 32 is deposited over the series of elements 28*a* to 28*g* leaving exposed the inner and outer edges of each element.

Then, as shown in FIG. 10, another series of metal elements 34*a* and 34*g* is deposited on the ferrite layer 32 so that the outer and inner edges of each element extend over the outer and inner edges, respectively, of the ferrite annulus 32. The outer edge of each top element 34*a* to 34*f* corresponds to and is joined to an outer edge of a lower element 28*a* to 28*f* and the inner edge of each top element 34*a* to 34*g* is joined to the inner edge of a lower element 28*a* to 28*g* which is adjacent the lower element which is joined to the outer edge of that same top element.

The top element 34*g* is provided with a connecting bonding pad 36 which extends outward to the edge of the ceramic substrate 2.

The resulting article is a toroid of ribbon-like windings on a ferrite armature. This type of inductor offers the advantages of higher current-carrying capacity and higher flux density per unit of area than a filamentary type. The broad conductor helps to trap the flux inside the core.

Steps in the manufacture of still another embodiment of the device of the present invention are shown in FIGS. 11–16.

In this embodiment, the thickness of the circuit element is reduced by recessing one of the ferrite layers within the ceramic substrate. As shown in FIG. 11, an annular-shaped layer of ferrite 38 is deposited within a similarly-shaped recess 37 in one surface of a ceramic substrate 2'. Prior to the deposition of the ferrite layer within the recess, a conducting path, in the shape of a metallic ribbon 40, is provided within the recess 37 extending from its inner edge 42 to its outer edge 44. A terminal pad 46 is provided at the end of the conducting ribbon 40 adjacent the inner edge of the ferrite annulus 38. Another conducting terminal pad 48 is provided on the end of the conducting ribbon 40 adjacent the outer edge of the ferrite annulus 38.

As shown in FIGS. 13 and 14, a spiral 50 of conducting material is deposited over the ferrite annulus 38. The inner end of the spiral is connected to the terminal pad 46, which, in turn, is connected via the metallic ribbon 40 to the terminal pad 48. The outer end of the spiral 50 is connected to another terminal pad 52 deposited on the ceramic substrate 2'. Next, as shown in FIGS. 15 and 16, a second layer of ferrite 54 is deposited over the conducting spiral 50 and the lower layer of ferrite 38, as well as on top of the central portion of the ceramic substrate 2'. The top layer of ferrite may be omitted, however.

What is claimed is:

1. A method of making a thick film inductor for hybrid integrated circuits comprising:

depositing on an insulating substrate a layer comprising sintered ferromagnetic particles in a catalyst-hardenable synthetic resin, at least partially curing said resin, depositing on the ferromagnetic-resin layer by screen printing a pattern of conductors constituting an inductance, said conductors comprising metal particles in a catalyst-hardenable resin binder, and curing said last-mentioned resin.

2. A method according to claim 1 including depositing a second layer of ferromagnetic particles in a catalyst-hardenable resin binder on top of said conductor pattern and said first layer.

3. An inductor for a thick-film hybrid circuit comprising:

an insulating substrate, a layer on said substrate comprising particles of a sintered ferromagnetic substance in a cured catalyst-hardenable resin binder in a proportion of at least about 4 to 1 by weight, a pattern of conductors on said layer constituting an inductance, said conductors comprising metal particles in a cured catalyst-hardenable resin binder.

4. An article according to claim 3 in which the percentage of ferromagnetic material in said layer is about 85.

5. An article according to claim 4 in which said ferromagnetic material is a ferrite.

6. An article according to claim 3 in which said resin in said layer and in said pattern of conductors is an epoxy resin.

7. An article according to claim 3 in which said pattern of conductors is a filamentary spiral.

8. An article according to claim 3 including a second layer of ferromagnetic particles in a catalyst-hardenable resin binder.

9. An article according to claim 8 including a second pattern of conductors on said second layer, connected to said first-mentioned pattern of conductors.

10. An article according to claim 9 in which both of said patterns of conductors are filamentary spirals.

11. An article according to claim 3 in which said layer of ferromagnetic particles and resin binder has the shape of an annulus and said pattern of conductors is a toroidal winding around said annulus.

12. An article according to claim 11 in which said toroidal winding has a ribbon-like configuration.

13. An article according to claim 3 in which said layer of ferromagnetic particles in said resin binder is recessed within said substrate.

* * * * *